(No Model.)
W. H. HOWES.
BRACELET GAGE.
No. 243,905. Patented July 5, 1881.
Fig: 1.
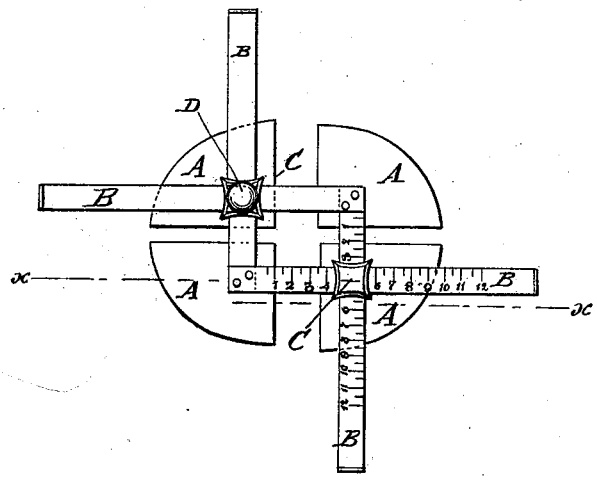
Fig: 2.
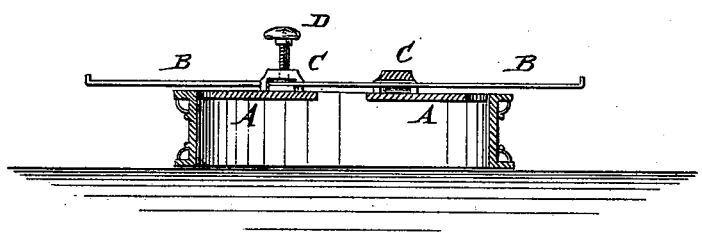
WITNESSES:
Chas. Nida
C. Sedgwick
INVENTOR:
W. H. Howes
BY Munn & Co
ATTORNEYS.

UNITED STATES PATENT OFFICE.

WILLIS H. HOWES, OF NEW YORK, N. Y.

BRACELET-GAGE.

SPECIFICATION forming part of Letters Patent No. 243,905, dated July 5, 1881.

Application filed April 14, 1881. (No model.)

*To all whom it may concern:*

Be it known that I, WILLIS H. HOWES, of the city, county, and State of New York, have invented a new and useful Improvement in Bracelet-Gages, of which the following is a specification.

Figure 1 is a plan view of my improvement; and Fig. 2 is a sectional side elevation of the same, taken through the line $x\ x$, Fig. 1.

Similar letters of reference indicate corresponding parts.

The object of this invention is to facilitate the manufacture of bracelets of a given form and size, and also to facilitate the selection of bracelets of a given form and size from a stock.

The invention consists in constructing a bracelet-gage with four quarter-sections of an oval, connected by four bars, secured in pairs at right angles with each other to two diagonal sections, the said bars passing through keepers attached to the other section and being locked in place by a set-screw, whereby the gage can be adjusted to fit a bracelet of any desired size and form, as will be hereinafter fully described.

The body of the gage is formed by dividing an oval plate of suitable size into four equal parts or sections, A.

To two alternate or diagonal sections A, near their angles, are secured the ends of two pairs of bars, B, the bars of each pair being at right angles with each other and parallel with the straight edges of the said sections, so that the corresponding bars of the two pairs will be parallel with each other. To the other two sections A, at points corresponding with the points at which the ends of the bars B are attached to the first sections, are secured keepers C, each of which has two openings formed through it at right angles with each other, to receive the bars B, which thus pass through the said keepers C at right angles with each other, as shown in Fig. 1. One of the keepers C is provided with a set-screw, D, which passes through the top of the said keeper C and rests against the upper bar, B, so as to clamp the said bars in the said keeper, and thus lock all the parts of the gage in place.

The gage is designed especially for use in connection with the gage for bracelets for which Letters Patent were granted to me April 19, 1881, in manufacturing bracelets of a given form and size, and for selecting bracelets of a given form and size from a stock. It can also be used for selecting bracelets corresponding in form and size with another bracelet—as, for instance, when bracelets are ordered to correspond in shape and size with a bracelet offered as a sample. Two of the bars B that cross each other have scales of sizes formed upon them and numbered to correspond with the scales upon the gage for which Letters Patent No. 240,418 were granted to me April 19, 1881.

In using the gage it is placed in the gage above referred to, or in a sample bracelet, with the projecting ends of the bars B resting upon the edge of the said gage or bracelet, and the sections A are adjusted to bring their curved edges against the inner surface of the four quarters of the said gage or bracelet, and are secured in place by turning down the screw D. The gage is then removed, and can be used in making a bracelet of that exact shape and size or for selecting bracelets from a stock. The ends of the bars B can be bent up slightly to prevent them from slipping out of the keepers C.

Having thus described my invention, I claim as new and desire to secure by Letters Patent—

1. A bracelet-gage constructed substantially as herein shown and described, consisting of the four quarter-sections A of an oval, the four bars B, attached in pairs and at right angles with each other to two diagonally-opposite sections A, the keepers C to receive the bars B, and the locking-screw D, as set forth.

2. In a bracelet-gage, the combination, with the four quarter-sections A of an oval, of the two pairs of arms B, the two keepers C, and the locking-screw D, substantially as herein shown and described, whereby the gage can be adjusted to fit bracelets of any desired form and size, as set forth.

WILLIS H. HOWES.

Witnesses:
 JAMES T. GRAHAM,
 C. SEDGWICK.